Dec. 19, 1939.  S. J. HEAVYSIDE  2,183,885
LENS
Filed April 26, 1937  3 Sheets-Sheet 1
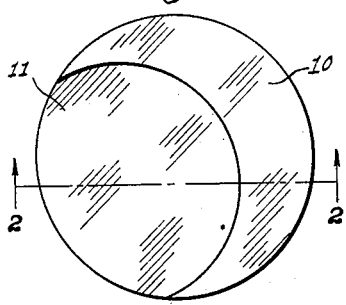
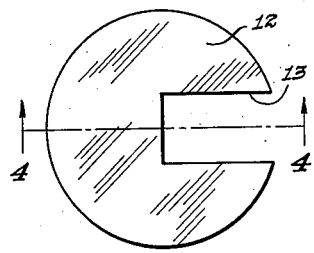
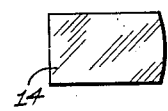
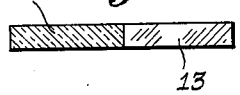
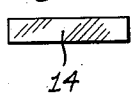
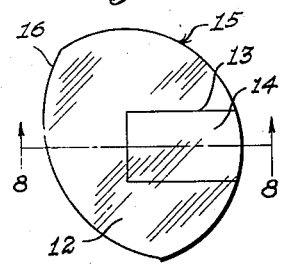
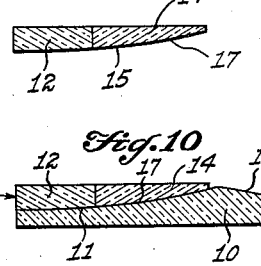
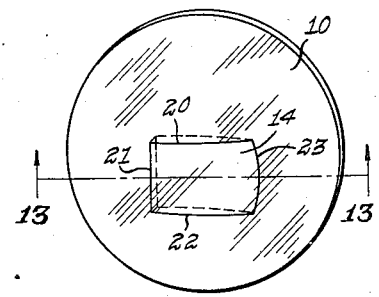
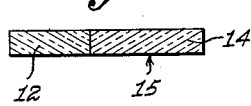
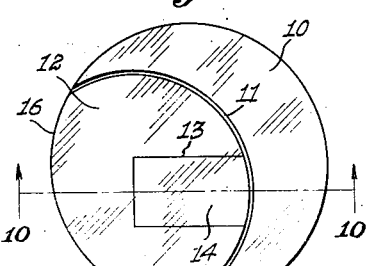
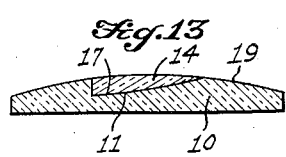
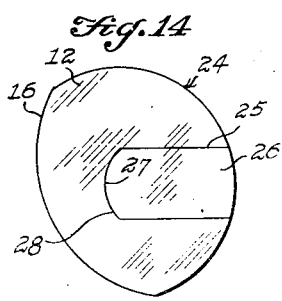
INVENTOR
STUART J. HEAVYSIDE
BY
ATTORNEYS Dec. 19, 1939. S. J. HEAVYSIDE 2,183,885
LENS
Filed April 26, 1937 3 Sheets-Sheet 2
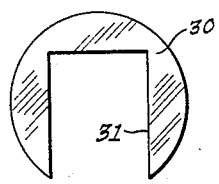
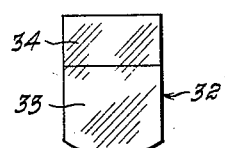
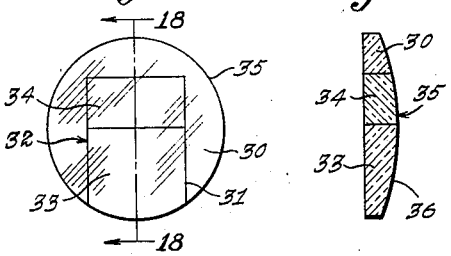
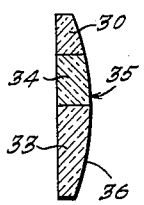
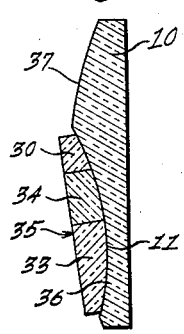
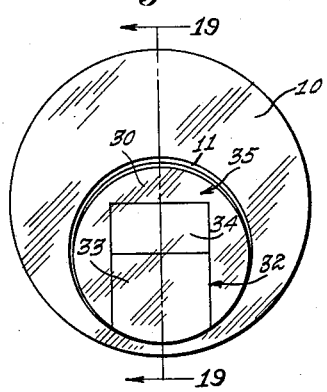
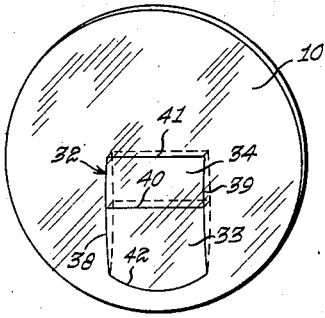
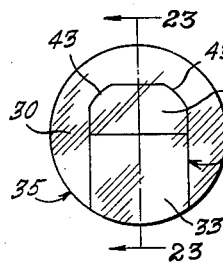
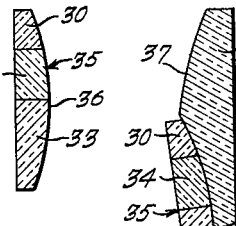
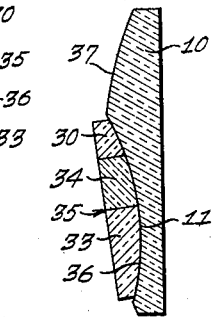
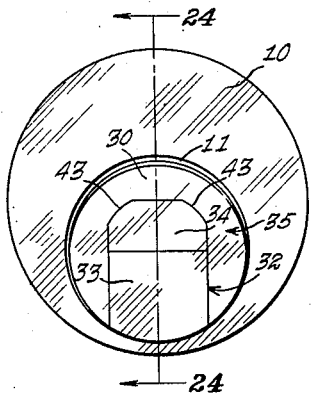
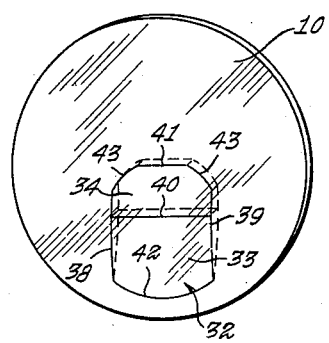
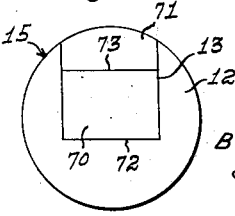
INVENTOR
STUART J. HEAVYSIDE
BY
Toulmin & Toulmin
ATTORNEYS

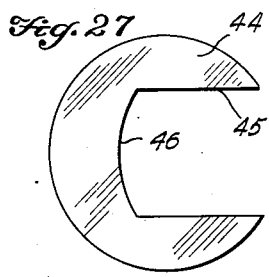
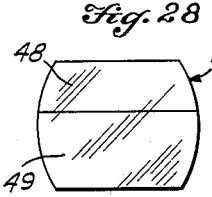
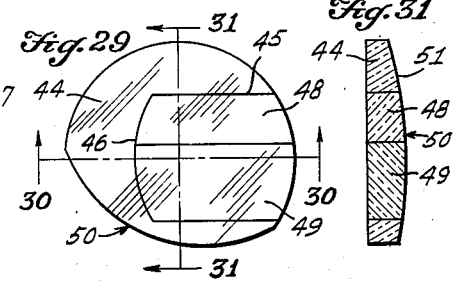
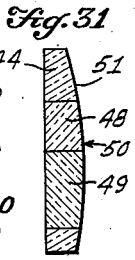
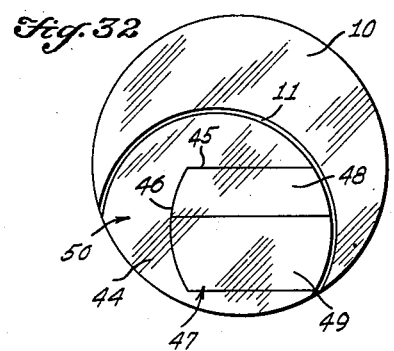
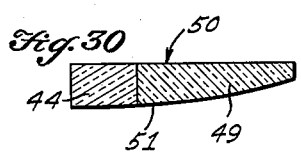
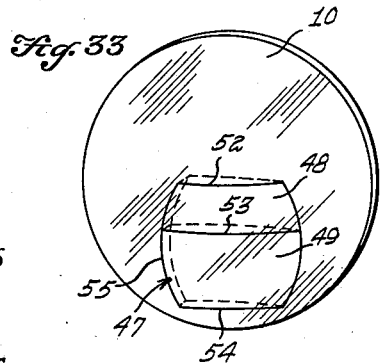
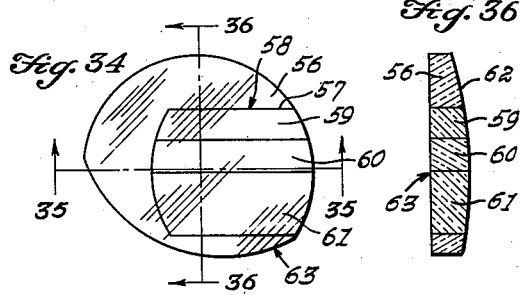
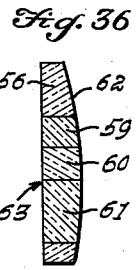
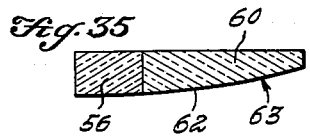
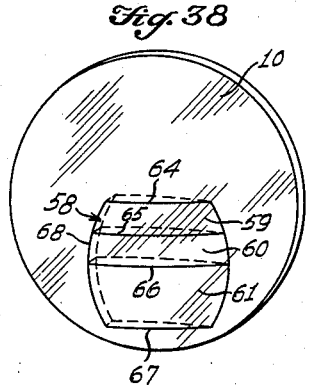
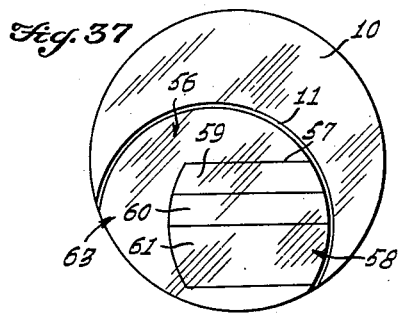
INVENTOR
STUART J. HEAVYSIDE
BY
ATTORNEYS Patented Dec. 19, 1939

2,183,885

UNITED STATES PATENT OFFICE 2,183,885

LENS

Stuart J. Heavyside, Dayton, Ohio, assignor to The Univis Corporation, Wilmington, Del., a corporation of Delaware Application April 26, 1937, Serial No. 138,908

2 Claims. (Cl. 88—54)

This invention relates to ophthalmic lenses, and in particular, to multifocal lenses having prismatic powers in the segments.

One object of this invention is to provide a multifocal lens having a predetermined prismatic power in the segment thereof, this segment being fused into the major portion of the lens.

Another object is to provide a fused multifocal lens having a prismatic segment of a different index of refraction secured within the major portion of the lens.

Another object is to provide a multifocal lens having a major portion with a countersink and a button secured therein, consisting of a carrying member and a segment inserted in a cutaway portion thereof so as to provide a predetermined prismatic power in the segment.

Another object is to provide a multifocal lens having a major portion with a countersink and a button secured therein, having a portion cut away from the edge thereof and containing a segment of a different index of refraction so as to cause the segment to have a prismatic power.

Another object is to provide a multifocal lens consisting of a major portion with a countersink and a button secured therein, having an edge cutaway portion with a multiple segment secured therein, having parts of different indices of refraction so as to provide prismatic powers of predetermined amount in one or more of said segment parts.

In the drawings:

Figure 1 is a front view of a major portion with a countersink therein for making the multifocal lens of this invention.

Figure 2 is a section along the line 2—2 in Figure 1.

Figure 3 is a front view of a carrying member for insertion in the countersink of Figure 1.

Figure 4 is a section along the line 4—4 in Figure 3.

Figure 5 is a front view of a segment for insertion in a cutaway portion of the carrier button of Figure 3.

Figure 6 is a side view of the segment shown in Figure 5.

Figure 7 is a front view of the assembled button with the segment of Figure 5 secured in the carrier member of Figure 3, and cut to a shape suitable for insertion in the countersink of Figure 1.

Figure 8 is a section along the line 8—8 of Figure 7.

Figure 9 is a section similar to Figure 8, but showing the button after the countersink contacting surface has been ground.

Figure 10 is a section along the line 10—10 of Figure 11, showing the button after being secured within the countersink of Figure 1.

Figure 11 is a front view of the multifocal lens blank of this invention, after the button has been secured in the countersink.

Figure 12 is a front view of the completed lens made by surfacing the blank shown in Figure 11.

Figure 13 is a section along the line 13—13 in Figure 12.

Figure 14 is a view similar to Figure 7, but showing a slightly modified form of segment.

Figure 15 is a front view of a modified form of carrier member.

Figure 16 is a front view of a multiple segment for insertion in the carrier member of Figure 15.

Figure 17 is a front view of a button after the multiple segment of Figure 16 has been secured within the carrier member of Figure 15.

Figure 18 is a section along the line 18—18 in Figure 17.

Figure 19 is a section along the line 19—19 in Figure 20.

Figure 20 is a front view of a trifocal lens blank after the button of Figure 17 has been secured within the countersink of the major portion.

Figure 21 is a front view of a completed lens made by surfacing the blank of Figure 20.

Figure 22 is a view of a button similar to Figure 17 but of a slightly modified form.

Figure 23 is a section along the line 23—23 in Figure 22.

Figure 24 is a section along the line 24—24 in Figure 25.

Figure 25 is a front view of a trifocal lens blank made by securing the modified button of Figure 22 in the countersink of the major portion.

Figure 26 is a front view of a finished lens made by surfacing the blank of Figure 25.

Figure 27 is a front view of a carrier member of a further modified form.

Figure 28 is a front view of a multiple segment for insertion in the carrier member of Figure 27.

Figure 29 is a front view of a completed button after the segment of Figure 28 is secured within the carrier member of Figure 27 and surfaced ready for insertion in the countersink of the major portion.

Figure 30 is a section along the line 30—30 in Figure 29.

Figure 31 is a section along the line 31—31 in Figure 29.

Figure 32 is a front view of a trifocal lens blank after the segment of Figure 29 has been fused into the countersink of the major portion.

Figure 33 is a front view of the finished lens made by surfacing the blank of Figure 32, the segment prism bases being in a horizontal direction.

Figure 34 is a front view of a completed button, wherein three segments have been inserted in the cutaway portion of the carrier member.

Figure 35 is a section along the line 35—35 in Figure 34.

Figure 36 is a section on the line 36—36 in Figure 34.

Figure 37 is a front view of a quadrifocal lens blank made by securing the button of Figure 34 in the countersink of the major portion.

Figure 38 is a front view of a quadrifocal lens made by surfacing the blank of Figure 37.

Figure 39 is a front view of a modified button for providing a prism segment with its base up or down.

In general, the multifocal lens of this invention consists of a major portion having a countersink in which is secured a composite button. This composite button consists of a carrier member having a cutaway portion or slot extending from the edge toward the center, and a segment of corresponding outline secured within this cutaway portion or slot. When the button side of the blank is surfaced to a common curvature, the segment will possess a prismatic power as well as a focal power. The segment is preferably made of a higher index of refraction than the major portion, and the carrier member of the same index of refraction as the major portion.

While the drawings, in Figures 1 to 14, show a segment with the base of the prism toward the left, it will be understood that the base may be placed vertically, horizontally or obliquely, in any desired direction. In Figures 15 to 26 is shown a trifocal lens made in the same manner, but with the segment prism bases in a vertical direction. In Figures 27 to 33 is shown a trifocal lens with the segment prism bases in a horizontal direction. Figures 34 to 38 show a quadrifocal lens with the segment prism bases in a horizontal direction.

Referring to the drawings in detail, Figures 1 and 2 show a major portion or major lens 10 having a countersink 11 surfaced therein. A carrier member 12 is prepared with a cutaway portion or slot 13 extending inwardly from the edge (Figures 3 and 4). Within this cutaway portion 13 is secured, as by fusing, a segment 14. The carrier member 12 is preferably of the same index of refraction as the major portion 10, whereas the segment 14 is preferably of a higher index of refraction.

After the segment 14 has been secured to the carrier member 12 to form the button, generally designated 15, the edge of the button 15 thus formed is cut away, as at 16 (Figure 7) so as to be of a proper outline for uniting with the countersink 11 of the major portion 10. The surface 17 is then given a curvature substantially corresponding to the surface of the countersink 11, and the button 15 is then united, as by fusing, with the major portion 10 (Figures 10 and 11). The button side 18 of the major portion 10 is then surfaced to a common curvature 19, giving the finished lens shown in Figures 12 and 13. Due to the fact that the carrier member 12 is of substantially the same index of refraction as the major lens 10, it disappears and becomes indistinguishable from the major portion 10 so that the segment 14 alone becomes visible. This segment 14, however, now possesses three edges 20, 21 and 22, having buried shoulders, and a fourth edge 23 without a shoulder. The segment 14, therefore, possesses a prismatic power due to the positive thickness difference between the edges 23 and 21, the base of the prism being in the direction of the edge 21.

In Figures 12 and 13 the base of the segment prism 14 is shown to be in a horizontal direction and to the left. By rotating the segment 15 in the countersink, or by cutting the slot 13 in an oblique direction in the button 12, the segment may be given a prism with an oblique direction instead of purely horizontal.

The modified button 24 shown in Figure 14 consists of a carrier member 12 and a cutaway edge 16, as before, but the slot 25 and segment 26 secured therein are of different outline. The segment 26 has a curved end 27 and the slot 25 a curved edge 28 corresponding thereto. The appearance of the finished lens made by using the button 24 will be similar to that of Figure 12, except that the edge 21 will be curved instead of flat.

The trifocal lens of Figures 15 to 21, inclusive, is formed by preparing a carrier member 30 with a slot 31 therein, similar to the slot or cutaway portion 13 of Figure 3. Secured within this slot is a segment, generally designated 32, having portions 33 and 34 of different indices of refraction, the completed button 35 being shown in Figures 17 and 18. This button is surfaced as before with a surface 36, substantially the same as that of the countersink 11 in the major portion 10 and secured therein as by fusing. The completed blank is shown in Figures 19 and 20. A finished lens is made from this blank by surfacing the button side 37 of the major portion 10 to a common curvature, the finished lens being shown in Figure 21.

Because the carrier portion 30 is of substantially the same index of refraction as the major portion 10, it disappears and becomes integral with the major portion 10. The segment portions 33 and 34, however, being of different indices of refraction, stand out and present the appearance shown in Figure 21. It will be seen that these segment portions have common lateral edges 38 and 39, both being shouldered. A shouldered edge portion 40 separates the segment portions 33 and 34. The segment portion 34 possesses a top edge 41, likewise having a shoulder. Since the shoulder of the segment 32 is at the top thereof, the bases of the prisms in the segment portions 33 and 34 are vertical, hence, possess prism base-up effects. The segment edge 42 at the bottom thereof is without a shoulder and merges substantially with the major portion 10.

Thus, if the segment portion 33 is of a high index of refraction and the segment portion 34 of an intermediate index of refraction relatively to the major portion 10, the lens of Figure 21 will be a trifocal lens having prismatic intermediate and near portions 34 and 33, respectively, the prisms being base-up in both segments. If, however, the portion 34 is given a higher index than the portion 33, the portion 34 will be a near portion and the portion 33 an intermediate portion. The trifocal lens shown in Figures 22 to 26 is similar to the trifocal lens shown in Figures 15 to 21, except that the upper corners of the segment 32 are rounded, as at 43.

The trifocal lens shown in Figures 27 to 33, inclusive, is similar to that shown in Figures 15 to 21, except that the bases of the prisms in the segments are horizontal instead of vertical. For this purpose the carrier member 44 is provided with a slot or cutaway portion 45 having a curved end 46. Secured within this cutaway portion 45 is a multiple segment 47 having portions 48 and 49 of different refractive indices, the completed button 50 being shown in Figures 29 to 31. This button is surfaced with a surface 51 of curvature suitable for engaging the countersink 11 of the major blank 10 and secured therein. The completed blank thus provided is shown in Figure 32.

When the button side of this blank is surfaced to a common curvature a finished lens results, as shown in Figure 33. Since the carrier member 44 is of the same index of refraction as the major portion 10, it will disappear leaving only the segment portions 48 and 49. As before, the segment portion of higher index of refraction will be a near vision portion and that of an intermediate index of refraction will be an intermediate vision portion. The segment 48 is provided with a top edge 52 having a variable but buried shoulder and a shouldered bottom edge 53, forming a boundary between the two segment portions. The segment portion 49 likewise has a shouldered bottom edge 54, and both portions have a common shouldered edge 55. It will be understood that these shoulders are not capable of being felt by running the finger over the lens, but are nevertheless present because of the difference in the indices of refraction between the major lens 10 and the segment portions 48 and 49, even though they are buried within the major lens 10.

In the trifocal lens of Figure 33 the bases of the prisms of the segment portions 48 and 49 are to the left, but it will be obvious that they could be equally well arranged to the right or in an oblique direction, in the event that the slot or cutaway portion 45 is cut obliquely into the carrier member 44.

The quadrifocal lens shown in Figures 34 to 38 is made in a manner similar to the trifocal lens of Figures 27 to 33, and includes a carrier member 56 having a similar cutaway portion or slot 57, in which is inserted a multiple segment 58 consisting of segment portions 59, 60 and 61 of indices of refraction differing not only from each other but also from that of the major lens 10. These three segment portions are secured within the cutaway portion 57 of the carrier member 56, the latter being of substantially the same index of refraction as the major lens 10, and the resulting button is given a surface curvature on the surface 62 corresponding to that of the countersink 11.

When the button, generally designated 63, of Figure 34 is fused into the countersink of the major lens 10, the completed blank of Figure 37 is obtained. When the button side of this blank is surfaced to a common curvature the finished lens, shown in Figure 38, is produced. In this finished lens the carrier member 56 disappears, as before, leaving the three segments 59, 60 and 61 with buried and shouldered edges 64, 65, 66, 67 and 68. The edge 69 is without a shoulder and merges substantially with the major lens 10. Accordingly, the bases of the three segments 59, 60 and 61 are to the left in Figure 38, but it will be obvious that they could be equally well directed to the right. If the cutaway portion 57 is placed obliquely in the carrier member 56, the bases of the prisms in the segment portions 59, 60 and 61 can be also placed in an oblique direction.

The segment portions 59, 60 and 61 will have different focal powers, according to their respective refractive indices. The segment portion of the highest index will be adapted for vision at the nearest distance and that of the lowest refractive index at the farthest distance, excepting the distance vision provided by the major lens 10. Thus the lens of Figure 38 is a quadrifocal lens, providing vision at four different distances. If the segment portion 59 is of a relatively low index of refraction, the portion 60 of an intermediate index and the portion 61 of a high index, then the portion 59 will have a far-intermediate power, the portion 60 a near-intermediate power and the portion 61 a near power.

The modified form of button 15 shown in Figure 39 has the purpose of providing a segment 70 with its base up or down instead of in or out, as in the segment 14 of Figures 1 to 13, inclusive. The carrier member 12 is similar to that shown in Figure 3, and is provided with a similar slot 13 extending inwardly from an edge. Secured within this slot is a segment 70, of higher refractive index than the carrier member 12, and a filler portion 71 occupies the remainder of the space within the slot 13. This filler portion 71 is of the same index of refraction as the carrier member 12, and fills the space between the top edge of the segment and the edge of the carrier member 12.

When this assembly is fused together the segment 70 and filler portion 71 become firmly secured to the side walls of the slot 13 in the carrier member 12. The button 15 thus formed is placed in the countersink of a major portion 10, but with the filler portion 71 vertical. When fusing takes place and the button side of the blank is surfaced, the carrier member 12 and filler portion 71 will unite with and become substantially indistinguishable from the major portion 10 because they are of substantially the same index of refraction. The segment 70, however, will stand out clearly because of a buried shoulder on all sides thereof. The edges 72 and 73 will be of different thickness, however, so that the base of the prism in the segment will be vertical instead of horizontal, as in Figures 1 to 13. In the form shown in Figure 39 the edge 73 will be thinner than the edge 72, hence, the base of the prism will be at the bottom of the segment and the apex at the top.

It will be understood that I desire to comprehend within this invention such modifications as come within the scope of the claims and the invention.

Having thus fully described my invention, what I claim as new and desire to secure by Letters Patent, is:

1. In a multifocal lens, a major lens having a countersink and a button secured within said countersink, said button consisting of a carrier member of substantially the same refractive index as the major lens, said carrier member having an elongated substantially rectangular cutaway aperture extending outwardly to an edge thereof, the length of said aperture outwardly being greater than its width transversely and a substantially rectangular insert consisting of a plurality of segments of different indices of refraction relatively to each other and to said carrier member secured in edge-to-edge relationship along their long edges within said cutaway aperture, at least one of said segments having opposite edges of different thickness whereby to provide multiple prismatic segments, said insert having shouldered edges on both of its long sides and on one of its short sides buried within said major lens and an unshouldered edge on the other short side substantially merging with said major lens.

2. In a multi-focal lens blank, a major lens having a countersink and a button secured in said countersink, said button consisting of a carrier member of substantially the same refractive index as the major lens, said carrier member having a horizontally elongated cutaway aperture therethrough extending outwardly to an edge thereof, the length of said aperture horizontally being greater than its width vertically, and a segment with opposite vertical edges of different thickness secured within said cutaway aperture and having an edge exposed at an edge of said carrier member, said segment having buried shouldered edges on both of its long sides and on the short side nearest the center of said carrier member, whereby to provide a prism segment bifocal lens blank which may be surfaced into a finished lens merely by grinding away the blank surface by a thickness approximately equal to the thickness of said exposed segment shoulder in addition to suitably surfacing the opposite side of the blank.

STUART J. HEAVYSIDE.